March 9, 1943.  C. O. MARSHALL  2,313,655
HYDRAULIC FORCE TRANSMISSION DEVICE
Filed July 29, 1941   2 Sheets-Sheet 2
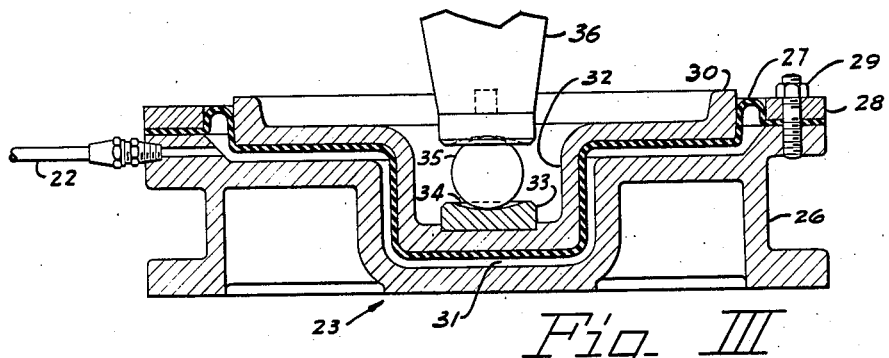
Fig. III
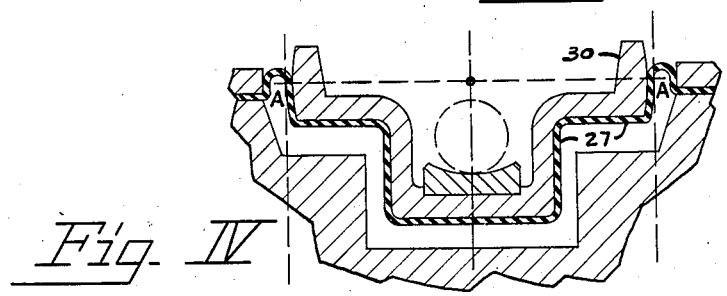
Fig. IV
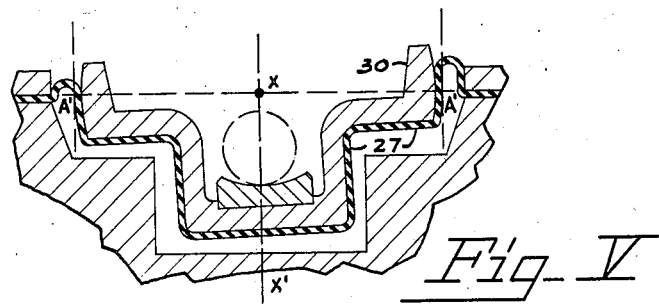
Fig. V
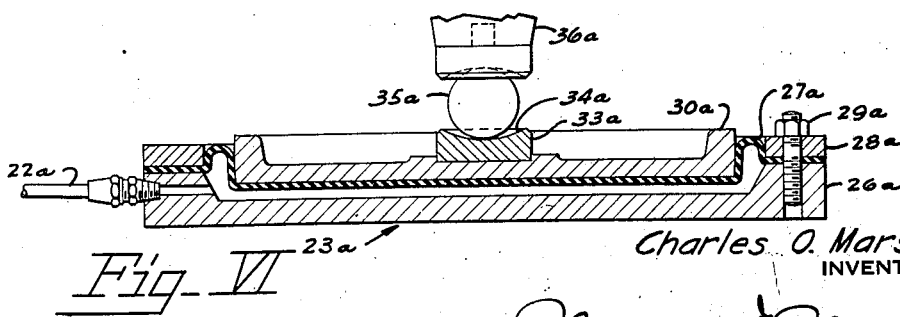
Fig. VI
Charles O. Marshall
INVENTOR
BY Marshall and Marshall
ATTORNEYS Patented Mar. 9, 1943

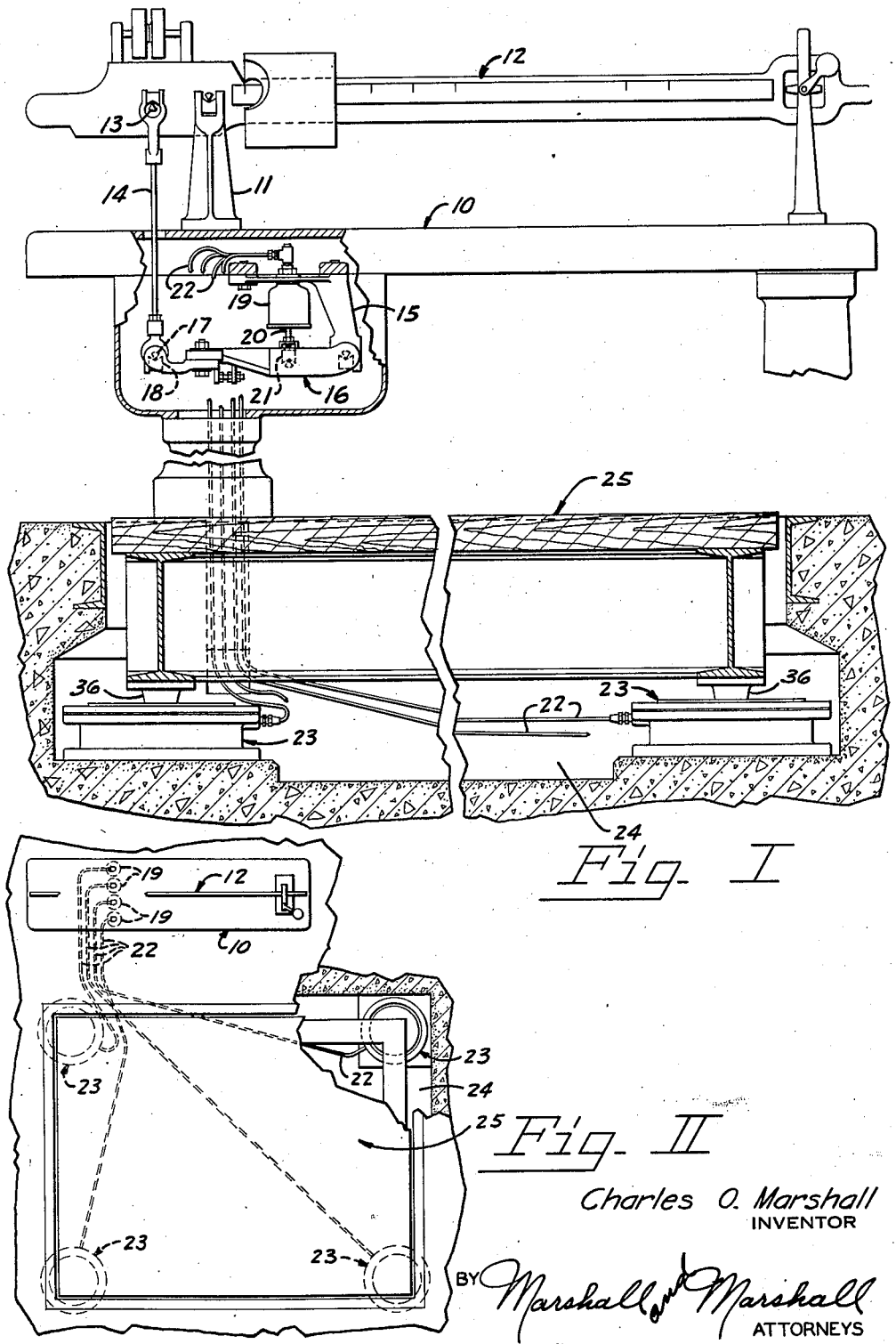

2,313,655

UNITED STATES PATENT OFFICE 2,313,655

HYDRAULIC FORCE TRANSMISSION DEVICE

Charles O. Marshall, Toledo, Ohio, assignor to Toledo Scale Company, Toledo, Ohio, a corporation of New Jersey Application July 29, 1941, Serial No. 404,517

6 Claims. (Cl. 265—47)

This invention relates to weighing scales of the type wherein pressure is transmitted from the load receiver to the load counterbalancing mechanism by means of a hydraulic system, and more particularly to that portion of the hydraulic system in which the fluid pressure transmitted by the hydraulic system is first created.

In a weighing scale of the hydraulic type some of the most important members are those which support the load receiver and create the fluid pressure which is transmitted through the hydraulic system of the scale. These capsules, as they are called, receive the load placed upon the load receiver and apply it to the hydraulic liquid by means of a pressure plate, usually horizontally disposed, acting through a flexible diaphragm which serves to confine the liquid in the capsules, the diaphragm and plate being floatingly supported by the liquid in the capsules. It has been found that the effective area of such a capsule pressure plate is a function of the longest horizontal straight line, terminating at the edges of the plate. The horizontal plane of support of the plate is that plane in which such line is located. These capsules, to properly support the load receiver, are preferably located beneath its extremities. When a load is placed near the center of the load receiver, and it is deflected thereby, its ends tend to tilt inwardly toward each other and thereby to shift outwardly the point of application of the load on the upper capsule plate. When the point of application of the load on the capsule shifts, the plate tends to tilt and its horizontal pressure area changes proportionately to the amount of tilting. A smaller pressure area under the same force, creates a higher pressure in pounds per square inch and, conversely, a larger area creates a lower pressure. Hence, a load placed at the center of the platform will create a different pressure in pounds per square inch in the hydraulic system than one placed immediately over a supporting capsule. Since the load counterbalancing mechanism of the scale is responsive to the pressure created by the load supported by the capsules, this will cause it to register a heavier load than that actually being weighed.

The accuracy of a hydraulic scale also is affected by changes in the angle at which the diaphragm "takes off" from the edge of the plate. To minimize the change in angle resulting from up and down movements of the plate, the diaphragm often is provided with an annular bead or corrugation that lies against the cylindrical edge of the plate, the purpose of the bead being to cause the diaphragm and the vertical cylindrical edge of the plate to meet at the same angle as the plate moves up and down. But when the plate tilts, the cylindrical edge no longer is vertical and consequently the angle at which the edge meets the diaphragm no longer is the same.

It is an object of this invention to provide a capsule having an upper capsule plate, the effective area of which will not be changed by the deflection of the platform.

It is another object of this invention to provide a hydraulic weighing scale which will register the correct weight whether the load is placed upon the center of the load receiver or in any other position thereon.

It is a further object of the invention to provide a capsule having a pressure plate so designed that tilting of the pressure plate will not vary its effective area.

It is still a further object to provide a pressure plate and diaphragm construction such that tilting of the plate will not change the angle at which the edge of the plate meets the diaphragm.

More specific objects and advantages are apparent from the description, in which reference is had to the accompanying drawings illustrating a preferred form of scale embodying the invention.

In the drawings:

Fig. I is a front elevation of a weighing scale embodying the invention.

Fig. II is a reduced plan view of the weighing scale illustrated in Fig. I, the positions of the supporting capsules and their connections to the load counterbalancing mechanism being indicated by dotted lines.

Fig. III is a detailed, enlarged view in vertical section of a capsule embodying the invention.

Fig. IV is a schematic view in vertical section of a capsule embodying the invention, showing the pressure plate in horizontal position, the limits of the effective pressure area being indicated by vertical broken lines.

Fig. V is a similar schematic view of the capsule illustrated in Fig. IV, showing the pressure plate in tilted position.

Fig. VI is a detailed, enlarged view in vertical section of a capsule embodying a modification of the invention.

These specific drawings and the specific description that follows merely disclose and illustrate the invention and are not intended to impose limitations upon the claims.

Mounted upon a beam stand 10, by means of a fulcrum stand 11, is a load counterbalancing beam 12 having the usual poise, indicating and locking loop, and adjusting weights. Carried by a load pivot 13 of the beam 12 is a vertically disposed pull rod 14 which passes through an opening in the beam stand 10.

Fulcrumed in a depending bracket 15, of the beam stand 10, is a horizontally disposed shelf lever 16. The shelf lever 16 has an adjustable nose pivot 17 which rests in a clevis-held bearing 18, attached to the lower end of the vertical pull rod 14. Mounted on a horizontal arm of the bracket 15 are pressure responsive chambers 19, each containing a vertically disposed bellows (not shown), through the open lower end of which extends a strut 20 which has attached to its lower end a bearing 21 resting on an individual load pivot of the shelf lever 16. Attached to each of the pressure responsive chambers 19 is a pipe 22 which is in communication with a corresponding capsule 23. The interior of each of the pressure responsive chambers 19, its corresponding pipe 22 and its connected capsule 23, form an individual self-enclosed hydraulic system. The capsules 23 are located within a scale pit 24 and support a load receiver 25.

Each of the capsules 23 (Fig. III) consists of a capsule body 26 over which is supported a flexible diaphragm 27, which is clamped to the capsule body 26, near its periphery, by means of an annular ring 28 held down by the nuts 29. A pressure plate 30 is supported on the upper surface of the flexible diaphragm 27.

The capsule body 26 has a centrally located cup-shaped depression 31 in its upper surface. The flexible diaphragm 27 is molded with a substantially conforming cup-shape, its depressed portion being centrally positioned within the depression 31 of the body 26. The flexible diaphragm 27 is adapted to confine liquid in the space between its lower surface and the upper surface of the body 26.

The pressure plate 30 also has a centrally located cup-shaped depression 32 which nests in the molded diaphragm 27 on which the plate is supported. The periphery of the horizontally disposed disk-like portion of the plate 30 is turned in the shape of the equatorial zone of a sphere. Located in the bottom of the cup-shaped depression 32 is a hardened plate 33, which has a concave surface 34 in its upper face. The center of curvature of the concave surface 34 is the same as the center of the sphere which forms the peripheral surface of the disk-like portion of the pressure plate 30. A ball 35 rests on the surface 34 and supports a leg 36 of the load receiver 25.

The effective pressure area of the plate 30 is a function of its greatest horizontal diameter as indicated by the broken line A—A (Fig. IV). When the pressure plate 30 is horizontal, the point of application of pressure is at the center of the concave surface 34. When the pressure plate 30 is tilted because of a lateral shift of the point of application of pressure on the surface 34 (deflection of the load receiver will cause such shifting), as illustrated in Fig. V, the effective diameter indicated by the line A'—A', and therefore the pressure area of the pressure plate 30, remains the same as when the plate was horizontal, as indicated by the vertical broken lines in Figs. IV and V. Thus, although the pressure plate 30 may be greatly tilted, its effective pressure area on the liquid contained in the individual hydraulic system is the same as when it was horizontal.

This provision alone, however, while it would eliminate a serious source of error in the scale, would not completely solve all related problems. If the curvature of the surface 34 were not centered at the same point as that of the periphery of the plate 30, when the point of application of the pressure were shifted laterally, such pressure would have components, one of which would exert force downwardly and the other of which would tend to move the plate 30 in the direction opposite to that through which the point of application of the force had been shifted. In addition, the ball 35, through which the pressure is applied to the surface 34, would tend to be driven further in the same direction as the shift of the application point, which would, in turn, tilt the plate further. Hence, a state of equilibrium never would be reached but the plate would be held against tipping out from under the ball only by the strength of the diaphragm. With the surface 34 having the same center of curvature as the periphery of the plate 30, the plate 30 is tilted only until the ball 35 has rolled over the surface 34 sufficiently to bring the vertical force line indicated by the broken line X'—X' in Fig. V into coincidence with the center of the ball 35, the center of curvature of the periphery of the plate 30 and the center of curvature of the surface 34. This means that the plate 30 will reach a point of equilibrium with the point of application of force on the same vertical line as when the plate is horizontal and, because of the sphere-shaped periphery, the pressure area will remain the same as before the plate was tilted.

Fig. VI illustrates a capsule embodying a modification of the invention. The capsule 23a consists of a capsule body 26a into which the pipe 22a is connected. Overlying the capsule body 26a is a flexible diaphragm 27a, which is clamped to the body 26a, near its periphery, by the annular clamping ring 28a held down by nuts 29a. A pressure plate 30a is supported on the upper surface of the flexible diaphragm 27a. The pressure plate 30a is substantially disk-shaped and its periphery is constructed in the shape of the equatorial zone of a sphere. The horizontal plane of support of the pressure plate 30a on the flexible diaphragm 27a is substantially on a horizontal "great circle" of the sphere forming the periphery of the plate 30a. Located at the center of the plate 30a is a hardened pressure plate 33a which has a concave surface 34a in its upper face. A ball 35a rests in the surface 34a and supports a leg 36a of the load receiver 25.

The effective pressure area of the plate 30a is a function of its greatest horizontal diameter which horizontal diameter is not changed by tilting the plate 30a as already described in connection with the capsule illustrated in Fig. III.

The embodiments of the invention that have been disclosed may be modified to meet various requirements.

Having described the invention, I claim:

1. In a weighing scale, in combination, a plurality of capsules adapted to contain liquid, each of said capsules comprising a body, a flexible diaphragm overlying said body and adapted to confine such liquid therein, said diaphragm being floatingly supported by such liquid, and a pressure plate supported upon said flexible diaphragm, the periphery of said pressure plate being shaped substantially like the equatorial zone of a sphere, the horizontal plane of support of said plate lying substantially on the horizontal "great circle" of such sphere and a load receiver supported on said pressure plates.

2. In a weighing scale, in combination, a plurality of capsules, each of said capsules including a flexible diaphragm adapted to confine liquid in said capsule, said diaphragm being floatingly supported by such liquid, and a pressure plate supported upon said flexible diaphragm, the periphery of said pressure plate having a shape substantially like that of the equatorial zone of a sphere, and a load receiver supported on said pressure plates at points below the planes of support of said flexible diaphragms in said capsules.

3. In a weighing scale, in combination, a plurality of capsules adapted to contain liquid, each of said capsules including a flexible diaphragm adapted to confine liquid therein, said diaphragm being floatingly supported by such liquid, and a pressure plate supported on said diaphragm, said pressure plate having a periphery forming the equatorial zone of a sphere and having a concave load supporting surface curved about the same center point as the sphere defining the periphery of said plate, and a load receiver supported on said concave supporting surfaces.

4. In a weighing scale, in combination, a plurality of capsules adapted to contain liquid, each of said capsules including a flexible diaphragm adapted to confine liquid therein, said diaphragm being floatingly supported by such liquid, and a pressure plate supported on said diaphragm, said pressure plate having a periphery forming the equatorial zone of a sphere and having a concave load supporting surface curved about the same center point as the sphere defining the periphery of said plate, said load supporting surface being located below the horizontal plane of support of said diaphragm, and a load receiver supported on said concave supporting surfaces.

5. In a weighing scale, in combination, a plurality of capsules adapted to contain liquid, each of said capsules comprising a body having a depression therein, a flexible diaphragm overlying said body and substantially conforming in shape to said body, said diaphragm being adapted to confine such liquid in said body, said diaphragm being floatingly supported by such liquid, and a pressure plate supported on said diaphragm, said pressure plate having a periphery shaped like the equatorial zone of a sphere, said pressure plate being supported on a horizontal plane lying substantially on the horizontal "great circle" of such sphere, and a load receiver supported on said pressure plates.

6. In a weighing scale, in combination, a plurality of capsules adapted to contain liquid, each of said capsules comprising a body having a depression therein, a flexible diaphragm overlying said body and substantially conforming in shape to said body, said diaphragm being adapted to confine such liquid in said body, said diaphragm being floatingly supported by such liquid and a pressure plate supported on said diaphragm, said pressure plate having a periphery shaped like the equatorial zone of a sphere, said pressure plate being supported on a horizontal plane lying substantially on the horizontal "great circle" of such sphere and having a concave supporting surface curved about the same center point as such sphere defining the periphery of said plate, and a load receiver supported on said concave supporting surfaces.

CHARLES O. MARSHALL.